Patented June 21, 1927.

1,632,909

UNITED STATES PATENT OFFICE.

SUMNER REDWAY MASON, OF WILMETTE, ILLINOIS, ASSIGNOR TO WESTERN ELECTRIC COMPANY, INCORPORATED, OF NEW YORK, N. Y., A CORPORATION OF NEW YORK.

BUFFING AND CLEANING OF METAL PARTS.

No Drawing. Application filed March 28, 1921. Serial No. 456,479.

This invention relates to the buffing and cleaning of metal parts, and more particularly to an improved buffing compound for use in these operations.

The object of the invention is to provide a buffing compound which will insure a thorough cleansing of the buffed parts by a complete removal of all buffing compound when the parts are dipped into a bath of cleaning solution.

In the practice of buffing and cleaning metal parts as generally followed the parts are first buffed by the use of a buffing compound which consists of a mixture of tripoli, stearic acid, paraffin, tallow, and similar materials. After being buffed with this compound the metal parts are dipped into a hot alkaline solution for the purpose of removing the buffing compound therefrom. Difficulty is encountered in this operation, however, due to the fact that the relatively inert tripoli is not readily acted upon by the cleaning solutions, and buffing compound which has accumulated in crevices and depressions of the metal parts is not removed by the cleansing solution, and an extra operation of scrubbing is required on such parts in order that they may be entirely freed from the buffing compound.

In accordance with the general features of this invention, a material is added to a plastic base buffing compound which when it is dipped into the alkaline solution will freely react therewith to cause a copious production of gas which will disintegrate the buffing compound remaining on the parts after the buffing operation and will set up a scrubbing operation which will entirely remove the buffing material remaining on the parts when they are dipped into the cleaning solution.

It has been found that the addition of a very small percentage of finely divided material such as aluminum or zinc added to the buffing compound will cause this compound to be rapidly reacted on by the hot alkaline cleaning solutions, which results in a copious and effervescence of hydrogen gas. This hydrogen gas as it is given off disintegrates the buffing compound and results in the production of a clean surface free from all buffing compounds. One per cent by weight of finely divided aluminum added to a buffing compound consisting of a mixture of tripoli, stearic acid, paraffin, tallow, and similar materials has been found to be sufficient to cause a reaction which will thoroughly disintegrate and remove the buffing compound from the metal parts.

What is claimed is:

1. A buffing compound comprising an abrasive, a suitable binder of fat and wax, and a small percentage of a metal capable of free reaction with an alkaline solution to cause a generation of hydrogen gas to remove the compound from a buffed surface.

2. A buffing compound comprising an abrasive, a suitable binder of fat and wax, and about one per cent by weight of finely divided aluminum.

3. A buffing compound for metal parts comprising tripoli, a binder of fat and wax, and a small percentage of a metal capable of free reaction with an alkaline solution to cause a generation of hydrogen gas.

4. A buffing compound comprising an abrasive, stearic acid, a binder of fat and wax, and a small percentage of a metal capable of reaction with an alkaline solution to cause a free generation of hydrogen gas.

5. A buffing compound comprising tripoli, stearic acid, paraffin, and a small percentage of aluminum.

6. A buffing compound comprising an abrasive, a suitable binder, and a small percentage of aluminum.

7. A buffing compound containing a binder of fat and wax, and an ingredient which will act to remove compound remaining on the surface after buffing.

8. A buffing compound having a plastic base and containing a chemically active ingredient to react with another substance to remove the compound remaining on the surface after buffing.

9. A buffing compound having a plastic base, an abrasive and finely divided active metal to react with a solution to remove the compound which remains on the surface after buffing.

10. A buffing compound for preparing a surface for plating, comprising a base of stearic acid, an abrasive, and aluminum which will react freely with an alkaline solution to cause an effervescence for dislodging and removing the compound which remains on the surface after buffing.

11. A buffing compound of a character to leave a film on a surface after buffing, comprising a binder of fat and wax, an abrasive and finely divided active metal capable of reacting with an alkaline solution to cause a violent effervescence within the film to completely dislodge and remove said film.

In witness whereof, I hereunto subscribe my name this 21st day of March A. D., 1921.

SUMNER REDWAY MASON.